(12) United States Patent
Vetzler et al.

(10) Patent No.: US 12,327,087 B2
(45) Date of Patent: Jun. 10, 2025

(54) IDENTIFYING A SEMANTIC REPRESENTATION FOR TEXTS BY EXPANDING THE EMBEDDING SPACE

(71) Applicant: International Business Machines Corporation, Armonk, NY (US)

(72) Inventors: Matan Vetzler, Givat Shmuel (IL); Koren Ran Lazar, Jerusalem (IL); Boaz Carmeli, Koranit (IL); Ateret Anaby-Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 18/136,825

(22) Filed: Apr. 19, 2023

(65) Prior Publication Data

US 2024/0354509 A1 Oct. 24, 2024

(51) Int. Cl.
*G06F 40/30* (2020.01)
*G06V 30/19* (2022.01)

(52) U.S. Cl.
CPC ........ *G06F 40/30* (2020.01); *G06V 30/19093* (2022.01)

(58) Field of Classification Search
None
See application file for complete search history.

(56) References Cited

U.S. PATENT DOCUMENTS

| | | | |
|---|---|---|---|
| 7,031,909 B2 | 4/2006 | Mao et al. | |
| 10,936,961 B1 * | 3/2021 | Jain | G06N 3/006 |
| 2019/0155944 A1 | 5/2019 | Mahata et al. | |
| 2022/0374598 A1 * | 11/2022 | Osuala | G06F 40/279 |
| 2023/0368080 A1 * | 11/2023 | Jha | G06N 20/20 |
| 2024/0220876 A1 * | 7/2024 | Sharma | G06Q 10/0631 |

OTHER PUBLICATIONS

Sarwar et al., "Evaluating Keyphrase Extraction Algorithms for Finding Similar News Articles Using Lexical Similarity Calculation and Semantic Relatedness Measurement by Word Embedding," PeerJ Computer Science, Jul. 7, 2022, pp. 1-25.

(Continued)

*Primary Examiner* — Nafiz E Hoque
(74) *Attorney, Agent, or Firm* — Shackelford, McKinley & Norton, LLP; Robert A. Voigt, Jr.

(57) ABSTRACT

A computer-implemented method, system and computer program product for identifying a semantic representation for a set of texts. The set of texts is encoded using a language model to obtain a set of corresponding texts' contextualized embeddings. A centroid of the contextualized embeddings is then calculated. A user-designated number of words from a pre-defined vocabulary of the language model that have their non-contextualized embeddings closest to the centroid are then identified. Furthermore, permutations of the identified words are calculated using an n-gram range. The permutations are then encoded using the language model in a contextualized manner. The encoded permutation from the encoded permutations with the greatest similarity to the centroid is identified. The identified encoded permutation is then assigned as the semantic representation of the set of texts. In this manner, the semantic representation is more effectively identified by expanding the embedding space upon which the semantic representation is chosen.

20 Claims, 6 Drawing Sheets

(56) References Cited

OTHER PUBLICATIONS

Amigo et al., "Using Syntactic Information to Extract Relevant Terms for Multi-Document Summarization," Proceedings of the 20th International Conference on Computational Linguistics, Dec. 13, 2011, pp. 1-7.

Gagliardi et al., "Semantic Unsupervised Automatic Keyphrases Extraction by Integrating Word Embedding with Clustering Models," Multimodal Technologies and Interaction, vol. 4, No. 30, Jun. 19, 2020, pp. 1-20.

Eric Kim, "Understanding Multi-Dimensionality in Vector Space Modeling," Apr. 16, 2019, pp. 1-21.

Kosmajac et al., "Graph-Based Topic Extraction Using Centroid Distance of Phrase Embeddings on Healthy Aging Open-Ended Survey Questions," 2020 International Conference on Data Mining Workshops, Feb. 16, 2021, pp. 621-628.

Kubek et al., "Centroid Terms as Text Representatives," Proceedings of the 2016 ACM Symposium on Document Engineering, Sep. 13, 2016, pp. 1-5.

Hacohen-Kerner et al., "Automatic Extraction of Keywords from Abstracts," Conference Paper in Lecture Notes in Computer Science, Sep. 2003, pp. 1-7.

Wartena et al., "Topic Detection by Clustering Keywords," Conference Paper, Oct. 2008, pp. 1-5.

Wu et al., "TextRank Keyword Extraction Method Based on Multi-Feature Fusion," Lecture Notes in Networks and Systems, vol. 235, 2021, pp. 493-501.

Github, "Minimial Keyword Extraction with BERT," http://github.com/MaartenGr/KeyBERT, 2023, pp. 1-7.

Bennani-Smires et al., "Simple Unsupervised Keyphrase Extraction Using Sentence Embeddings," Proceedings of the 22nd Conference on Computational Natural Language Learning, Brussels, Belgium, Oct. 2018, pp. 221-229.

Siddiqi et al., "Keyword and Keyphrase Extraction Techniques: A Literature Review," International Journal of Computer Applications, vol. 109, No. 2, Jan. 2015, pp. 18-23.

Wang et al., "Using Word Embeddings to Enhance Keyword Identification for Scientific Publications," Lecture Notes in Computer Science, 2015, pp. 257-268.

\* cited by examiner

IDENTIFYING A SEMANTIC REPRESENTATION FOR TEXTS BY EXPANDING THE EMBEDDING SPACE

TECHNICAL FIELD

The present disclosure relates generally to information extraction, and more particularly to improving the identification of a semantic representation for texts by expanding the embedding space.

BACKGROUND

In recent years, the amount of textual data has been growing exponentially. Since it has become infeasible to analyze such an enormous amount of data, it is beneficial for the user to have a representative and semantically meaningful representation (e.g., word, phrase, name) describing the texts which provides a good understanding of the data without having to manually analyze the texts. The process in identifying such a representation is referred to herein as "extraction."

For example, in the case of clustering unlabeled data, identifying a representation (e.g., word, phrase, name) that succinctly describes a cluster may assist the user to obtain a better understanding of the data without having to analyze the texts manually.

As a result, extraction algorithms (e.g., automatic keyword extraction algorithms) have been utilized to attempt to extract representations from texts that concisely reflect its semantic context. For example, the Text Rank algorithm, based on the PageRank algorithm, creates an undirected word graph where words that appear next to each other in the text are linked and the weight of each link depends on how frequent the two words appear next to each other. Then, based on this graph, each word is ranked which represents the word's importance. Unfortunately, the terms identified by such an extraction algorithm may not concisely reflect the semantic context of the texts.

Another example of an extraction algorithm is keyBERT, which leverages BERT (Bidirectional Encoder Representations from Transformers) embeddings to create keywords and key phrases that are most similar to a document. With keyBERT, a BERT-based model is used to obtain embeddings for the entire document as well as for every n-gram phrase in the text. An n-gram is a contiguous sequence of n items from a given sample of text. The BERT-based model then selects the n-gram phrase that satisfies the highest cosine similarity with the overall document embedding as the best representative candidate. Unfortunately, the texts' representative candidates only correspond to the n-grams which appear in the text. Furthermore, the extraction algorithm performs such extraction for each document individually as opposed to a group of documents. Hence, such a technique may not identify the most critical keywords, if such keywords do not appear together or are not located in the text itself.

As a result, there is not currently a means for effectively identifying the representation (e.g., word, phrase, name, etc.) that concisely reflects the semantic context of the texts.

SUMMARY

In one embodiment of the present disclosure, a computer-implemented method for identifying a semantic representation for a set of texts comprises encoding the set of texts using a language model to obtain a set of contextualized embeddings. The method further comprises calculating a centroid of the contextualized embeddings. The method additionally comprises identifying a user-designated number of words from a pre-defined vocabulary of the language model that have their non-contextualized embeddings closest to the centroid. Furthermore, the method comprises calculating permutations of the identified words using an n-gram range. Additionally, the method comprises encoding the permutations using the language model in a contextualized manner. In addition, the method comprises identifying an encoded permutation from the encoded permutations with a greatest similarity to the centroid. The method further comprises assigning the identified encoded permutation as the semantic representation for the set of texts.

In this manner, a semantic representation (e.g., word, phrase, name, etc.) may be more effectively identified for a set of texts by expanding the embedding space upon which the semantic representation is chosen. By utilizing a pre-defined vocabulary of the language model as well as considering all the text in the set of texts at once, the search space is expanded thereby allowing a semantic representation to be obtained outside from a given text.

In another embodiment of the present disclosure, a computer program product for identifying a semantic representation for a set of texts, where the computer program product comprises one or more computer readable storage mediums having program code embodied therewith, where the program code comprising programming instructions for encoding the set of texts using a language model to obtain a set of contextualized embeddings. The program code further comprises the programming instructions for calculating a centroid of the contextualized embeddings. The program code additionally comprises the programming instructions for identifying a user-designated number of words from a pre-defined vocabulary of the language model that have their non-contextualized embeddings closest to the centroid. Furthermore, the program code comprises the programming instructions for calculating permutations of the identified words using an n-gram range. Additionally, the program code comprises the programming instructions for encoding the permutations using the language model in a contextualized manner. In addition, the program code comprises the programming instructions for identifying an encoded permutation from the encoded permutations with a greatest similarity to the centroid. The program code further comprises the programming instructions for assigning the identified encoded permutation as the semantic representation for the set of texts.

In this manner, a semantic representation (e.g., word, phrase, name, etc.) may be more effectively identified for a set of texts by expanding the embedding space upon which the semantic representation is chosen. By utilizing a pre-defined vocabulary of the language model as well as considering all the text in the set of texts at once, the search space is expanded thereby allowing a semantic representation to be obtained outside from a given text.

In a further embodiment of the present disclosure, a system comprises a memory for storing a computer program for identifying a semantic representation for a set of texts and a processor connected to the memory. The processor is configured to execute program instructions of the computer program comprising encoding the set of texts using a language model to obtain a set of contextualized embeddings. The processor is further configured to execute the program instructions of the computer program comprising calculating a centroid of the contextualized embeddings. The processor is additionally configured to execute the program instructions of the computer program comprising identifying a user-designated number of words from a pre-defined vocabulary of the language model that have their non-contextualized embeddings closest to the centroid. Furthermore, the processor is configured to execute the program instructions of the computer program comprising calculating permutations of the identified words using an n-gram range. Additionally, the processor is configured to execute the program instructions of the computer program comprising encoding the permutations using the language model in a contextualized manner. In addition, the processor is configured to execute the program instructions of the computer program comprising identifying an encoded permutation from the encoded permutations with a greatest similarity to the centroid. The processor is further configured to execute the program instructions of the computer program comprising assigning the identified encoded permutation as the semantic representation for the set of texts.

In this manner, a semantic representation (e.g., word, phrase, name, etc.) may be more effectively identified for a set of texts by expanding the embedding space upon which the semantic representation is chosen. By utilizing a pre-defined vocabulary of the language model as well as considering all the text in the set of texts at once, the search space is expanded thereby allowing a semantic representation to be obtained outside from a given text.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
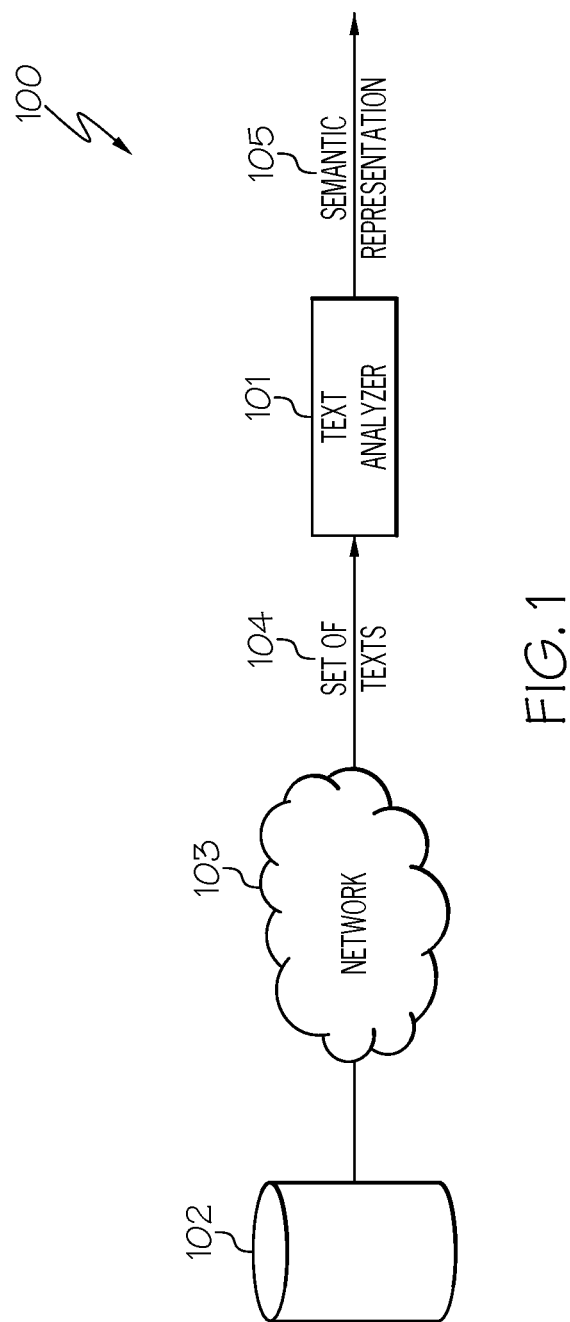
FIG. 1 illustrates a communication system for practicing the principles of the present disclosure in accordance with an embodiment of the present disclosure.

As stated in the Background section, extraction algorithms (e.g., automatic keyword extraction algorithms) have been utilized to attempt to extract representations from texts that concisely reflect its semantic context. For example, the Text Rank algorithm, based on the PageRank algorithm, creates an undirected word graph where words that appear next to each other in the text are linked and the weight of each link depends on how frequent the two words appear next to each other. Then, based on this graph, each word is ranked which represents the word's importance. Unfortunately, the terms identified by such an extraction algorithm may not concisely reflect the semantic context of the texts.

Another example of an extraction algorithm is keyBERT, which leverages BERT (Bidirectional Encoder Representations from Transformers) embeddings to create keywords and key phrases that are most similar to a document. With keyBERT, a BERT-based model is used to obtain embeddings for the entire document as well as for every n-gram phrase in the text. An n-gram is a contiguous sequence of n items from a given sample of text. The BERT-based model then selects the n-gram phrase that satisfies the highest cosine similarity with the overall document embedding as the best representative candidate. Unfortunately, the texts' representative candidates only correspond to the n-grams which appear in the text. Furthermore, the extraction algorithm performs such extraction for each document individually as opposed to a group of documents. Hence, such a technique may not identify the most critical keywords, if such keywords do not appear together or are not located in the text itself.

As a result, there is not currently a means for effectively identifying the representation (e.g., word, phrase, name, etc.) that concisely reflects the semantic context of the texts.

The embodiments of the present disclosure provide a means for more effectively identifying a semantic representation (e.g., word, phrase, name, etc.) for a set or collection of texts by expanding the embedding space upon which the semantic representation is chosen. In one embodiment, the texts are projected into a high-dimensional vector space using a pre-trained language model. The centroid of these vectors is then calculated using their arithmetic means. A user-designated number of words from a pre-defined vocabulary of the language model that have their non-contextualized embeddings closest to the centroid are then identified. Permutations of the identified words are then calculated using an n-gram range. "Permutations," as used herein, refer to different ways in which a collection of words can be arranged based on the n-gram range. An "n-gram," as used herein, refers to a contiguous sequence of n items from a given sample of text. An "n-gram range," as used herein, refers to the length of the sequence of consecutive words in a given text. Such permutations may then be encoded using the language model in a contextualized manner and the encoded permutation with the greatest similarity to the centroid is then identified. "Encoding," as used herein, refers to converting text to word embeddings, such as assigning text characters numeric values so as to "vectorize" the text. The identified encoded permutation is then assigned as the semantic representation of the texts. By utilizing a pre-defined vocabulary of the language model as well as considering all the text in the set of texts at once, the search space is expanded thereby allowing a semantic representation to be obtained outside from a given text. These and other features will be discussed in further detail below.

In some embodiments of the present disclosure, the present disclosure comprises a computer-implemented method, system and computer program product for identifying a semantic representation for a set of texts. In one embodiment of the present disclosure, a set of texts is encoded using a language model to obtain a set of corresponding texts' contextualized embeddings. "Encoding," as used herein, refers to converting text to word embeddings, such as assigning text characters numeric values so as to "vectorize" the text. A "word embedding," as used herein, refers to a dense vector of floating point values (the length of the vector is a parameter specified by a user). That is, word embeddings are dense vector representations of words in lower dimensional space. In other words, word embeddings offer semantic representations of words in vector space. In one embodiment, word embeddings correspond to contextualized word embeddings (also simply referred to herein as "contextualized embeddings"), which aim at capturing word semantics in different contexts. "Contextualized embeddings," as used herein, refer to vector representations of a word which changes when you use the word in different contexts. A centroid of the contextualized embeddings is then calculated. A "centroid," as used herein, refers to the center point in space of the embeddings. In one embodiment, the centroid is computed by uniformly averaging over all dimensions of the contextualized embeddings resulting in the centroid with a dimension corresponding to dimension d. A user-designated number of words (e.g., three words) from a pre-defined vocabulary of the language model (e.g., BERT) that have their non-contextualized embeddings closest to the centroid are identified. In one embodiment, the words from the pre-defined vocabulary of the language model that have their non-contextualized embeddings closest to the centroid are identified by calculating the cosine similarity between the words' non-contextualized embeddings with a dimension that corresponds to dimension d, and the centroid with a dimension that corresponds to dimension d. Furthermore, permutations of the identified words are calculated using an n-gram range. "Permutations," as used herein, refer to different ways in which a collection of words can be arranged based on the n-gram range. An "n-gram," as used herein, refers to a contiguous sequence of n items from a given sample of text. An "n-gram range," as used herein, refers to the length of the sequence of consecutive words in a given text. The permutations may then be encoded using the language model in a contextualized manner. The encoded permutation from the encoded permutations with the greatest similarity to the centroid is identified. The identified encoded permutation is then assigned as the semantic representation of the set of texts. In this manner, the semantic representation (e.g., word, phrase, name, etc.) for the set of texts is more effectively identified by expanding the embedding space upon which the semantic representation is chosen.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a text analyzer 101 connected to a database 102 via a network 103.

Network 103 may be, for example, a local area network, a wide area network, a wireless wide area network, a circuit-switched telephone network, a Global System for Mobile communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

As discussed above, there is not currently a means for effectively identifying a semantic representation (e.g., word, phrase, name, etc.) that concisely reflects the semantic context of a set of texts. A "semantic representation," as used herein, refers to a term, such as a word, phrase, name, etc., that semantically describes the essence, such as a topic, of a given set of texts. The "semantic context," as used herein, refers to the meaning in the set of texts in question. "Text," as used herein, refers to words written by an author, such as in a document, article, etc.

In one embodiment, text analyzer 101 analyzes a set of texts 104, such as from database 102, to identify a semantic representation 105 that concisely reflects the semantic context of such a set of texts 104. A "set," as used herein, refers to a collection. A "set of texts," as used herein, refers to a collection of texts to be analyzed by text analyzer 101. In one embodiment, such a set of texts includes different texts with a similar semantic context, which will be analyzed by text analyzer 101 at a single time. A discussion regarding text analyzer 101 identifying semantic representation 105 is provided below in connection with FIGS. 2-6. Furthermore, a description of the software components of text analyzer 101 is provided below in connection with FIG. 2 and a description of the hardware configuration of text analyzer 101 is provided further below in connection with FIG. 5.

System 100 is not to be limited in scope to any one particular network architecture. System 100 may include any number of text analyzers 101, databases 102 and networks 103.

A discussion regarding the software components used by text analyzer 101 to identify a semantic representation (e.g., semantic representation 105) for a set of texts (e.g., set of texts 104) is provided below in connection with FIG. 2.

Figure 2:
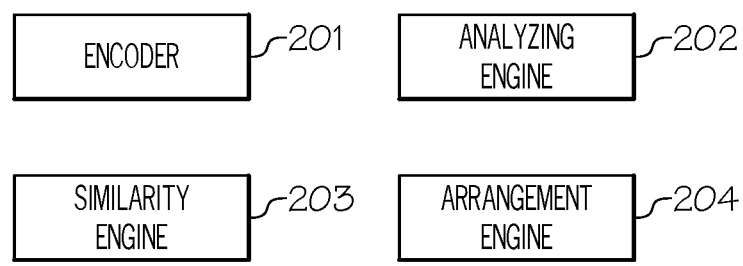
FIG. 2 is a diagram of the software components used by the text analyzer to identify a semantic representation for a set of texts in accordance with an embodiment of the present disclosure.

FIG. 2 is a diagram of the software components used by text analyzer 101 to identify a semantic representation (e.g., semantic representation 105) for a set of texts (e.g., set of texts 104) in accordance with an embodiment of the present disclosure.

Referring to FIG. 2, in conjunction with FIG. 1, text analyzer 101 includes an encoder 201 configured to encode a set of texts (e.g., set of texts 104) using a language model to obtain a corresponding set of contextualized embeddings. "Encoding," as used herein, refers to converting text to word embeddings, such as assigning text characters numeric values so as to "vectorize" the text. A "word embedding," as used herein, refers to a dense vector of floating point values (the length of the vector is a parameter specified by a user). That is, word embeddings are dense vector representations of words in lower dimensional space. In other words, word embeddings offer semantic representations of words in vector space. In one embodiment, the values for the word embeddings correspond to trainable parameters which are weights learned by the language model during training.

In one embodiment, word embeddings correspond to contextualized word embeddings (also simply referred to herein as "contextualized embeddings"), which aim at capturing word semantics in different contexts. "Contextualized embeddings," as used herein, refer to vector representations of a word which changes when you use the word in different contexts. In one embodiment, encoder 201 uses a language model, such as a contextualized language model, to convert text to contextualized embeddings. In one embodiment, encoder 201 uses a deep contextual language model, such as ELMo (Embeddings from Language Models) and BERT (Bidirectional Encoder Representation from Transformers), to perform such conversions.

Figure 3:
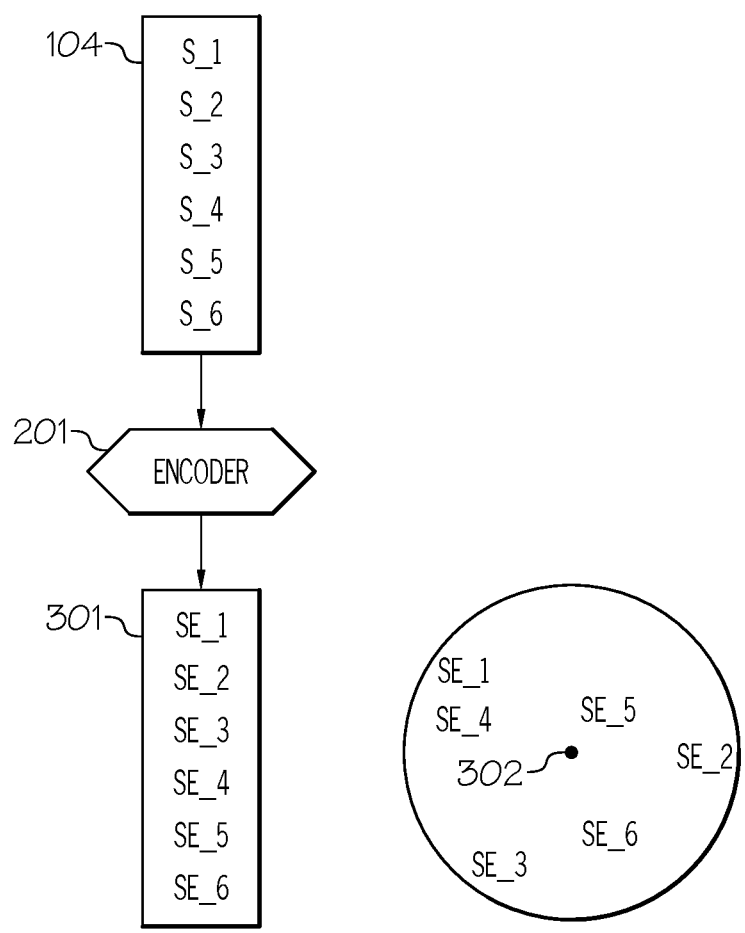
FIG. 3 illustrates encoding a set of texts to obtain a set of corresponding texts' contextualized embeddings and calculating a centroid of such contextualized embeddings in accordance with an embodiment of the present disclosure.

Text analyzer 101 further includes an analyzing engine 202 configured to calculate a centroid of the contextualized embeddings as illustrated in FIG. 3 (discussed below). A "centroid," as used herein, refers to the center point in space of the embeddings. In one embodiment, the centroid is computed by analyzing engine 202 by uniformly averaging over all dimensions of the contextualized embeddings resulting in the centroid with a dimension corresponding to dimension d. Such a centroid corresponds to the main semantic meaning of the set of texts 104.

Referring now to FIG. 3, FIG. 3 illustrates encoding a set of texts (e.g., set of texts 104) to obtain a set of corresponding texts' contextualized embeddings and calculating a centroid of such contextualized embeddings in accordance with an embodiment of the present disclosure.

As shown in FIG. 3 in conjunction with FIG. 1, set of texts 104 (e.g., S_1, S_2, S_3, S_4, S_5 and S_6) is encoded by encoder 201 using a language model (e.g., BERT) to obtain a set of corresponding texts' contextualized embeddings 301 (e.g., SE_1, SE_2, SE_3, SE_4, SE_5 and SE_6).

As discussed above, in one embodiment, analyzing engine 202 computes the centroid (e.g., centroid 302) of contextualized embeddings 301, such as by uniformly averaging over all dimensions of contextualized embeddings 301 resulting in a centroid 302 with a dimension corresponding to dimension d.

Returning to FIG. 2, in conjunction with FIGS. 1 and 3, text analyzer 101 further includes a similarity engine 203 configured to identify a user-designated number of words (e.g., three words) from a pre-defined vocabulary of the language model (language model used to obtain the contextualized embeddings of the set of texts 104 discussed above) (e.g., BERT) that have their non-contextualized embeddings closest to the centroid, such as centroid 302.

A "vocabulary," as used herein, refers to a set of unique words used in a text corpus for the language model (e.g., BERT). In one embodiment, an expert populates the vocabulary of the language model.

Figure 4:
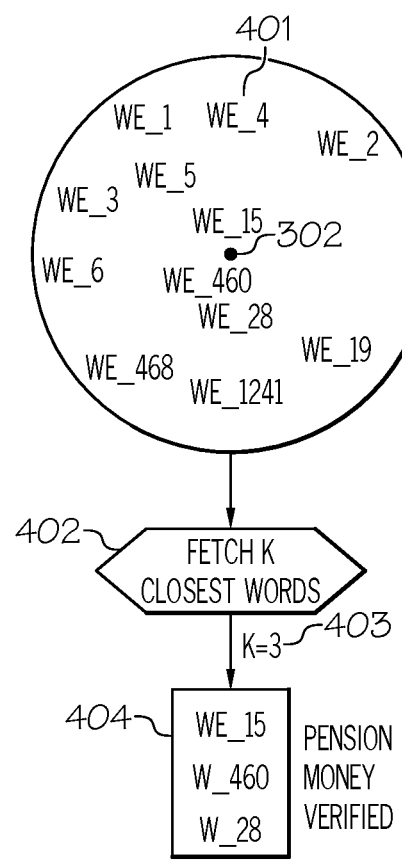
FIG. 4 illustrates identifying a user-designated number of words from the pre-defined vocabulary of the language model that have their non-contextualized embeddings closest to the centroid in accordance with an embodiment of the present disclosure.

In one embodiment, similarity engine 203 identifies the user-designated number of words from the pre-defined vocabulary of the language model (language model used to obtain the contextualized embeddings of the set of texts 104 discussed above) that have their non-contextualized embeddings closest to centroid 302 by calculating the cosine similarity between the words' non-contextualized embeddings with a dimension that corresponds to dimension d, and centroid 302 with a dimension that corresponds to dimension d as illustrated in FIG. 4 (discussed further below). By utilizing words from the pre-defined vocabulary of the language model, the embedding space upon which the semantic representation is chosen is expanded as discussed below.

In one embodiment, encoder 201 encodes the words from the pre-defined vocabulary of the language model (language model used to obtain the contextualized embeddings of the set of texts 104 discussed above) using a language model (discussed below) to obtain a set of corresponding non-contextualized embeddings. "Non-contextualized embeddings," as used herein, refer to embeddings where the vector representation is static. That is, the embedding is the same no matter how the word is used in the sentence. In other words, the vector representation of the word does not change when you use the word in different contexts.

In one embodiment, encoder 201 utilizes a Word2Vec approach to obtain non-contextualized embeddings from the pre-defined vocabulary of the language model (language model used to obtain the contextualized embeddings of the set of texts 104 discussed above). Word2Vec is a group of related models that are used to produce word embeddings. These models are shallow, two-layer neural networks that are trained to reconstruct linguistic contexts of words. Word2Vec takes as its input a large corpus of text and produces a vector space, typically of several hundred dimensions, with each unique word in the corpus being assigned a corresponding vector in the space.

In one embodiment, the language model used by encoder 201 to obtain the non-contextualized embeddings from the pre-defined vocabulary corresponds to the continuous bag-of-words (CBOW) model using the Word2Vec approach. In one embodiment, the language model corresponds to the continuous skip-gram model using the Word2Vec approach.

In another embodiment, encoder 201 uses the GloVe (global vectors) model for obtaining the set of non-contextualized embeddings from the pre-defined vocabulary of the language model (language model used to obtain the contextualized embeddings of the set of texts 104 discussed above). In one embodiment, GloVe model is an unsupervised learning algorithm for obtaining vector representations for words. In one embodiment, such vector representations for words are achieved by mapping words into a meaningful space where the distance between the words is related to semantic similarity.

As stated above, in one embodiment, similarity engine 203 calculates the cosine similarity between the words' non-contextualized embeddings with a dimension that corresponds to dimension d, and centroid 302 with a dimension that corresponds to dimension d. "Cosine similarity," as used herein, refers to a measure of similarity between two non-zero vectors defined in an inner product space. Cosine similarity is the cosine of the angle between the vectors. That is, it is the dot product of the vectors divided by the product of their lengths.

Referring now to FIG. 4, FIG. 4 illustrates identifying a user-designated number of words (e.g., three) from the pre-defined vocabulary of the language model (e.g., BERT) that have their non-contextualized embeddings closest to the centroid (e.g., centroid 302) in accordance with an embodiment of the present disclosure.

As shown in FIG. 4, encoder 201 encodes the words from the pre-defined vocabulary of the language model (language model used to obtain the contextualized embeddings of the set of texts 104 discussed above) using a language model (e.g., CBOW model) to obtain a set of corresponding non-contextualized embeddings 401 (e.g., WE_1, WE_2, WE_3, WE_4, WE_5, WE_6, WE_15, WE_19, WE_28, WE_460, WE_468, WE_1241).

Furthermore, as shown in FIG. 4, similarity engine 203 fetches K closest words 402 (words' non-contextualized embeddings) out of the pre-defined vocabulary to centroid 302, where K=3 (see element 403).

As discussed above, in one embodiment, as shown in FIG. 4, similarity engine 203 identifies the three words from the pre-defined vocabulary of the language model (language model used to obtain the contextualized embeddings of the set of texts 104 discussed above) that have their non-contextualized embeddings as being the three closest to centroid 302 by calculating the cosine similarity between the words' non-contextualized embeddings with a dimension that corresponds to dimension d, and centroid 302 with a dimension that corresponds to dimension d. For example, the words, pension, money and verified, associated with the non-contextualized embeddings W_15, W_460 and W_28, respectively, were identified as being the three closest words (the words' non-contextualized embeddings) to centroid 302 as shown by element 404.

Returning to FIG. 2, in conjunction with FIGS. 1 and 3-4, text analyzer 101 includes an arrangement engine 204 configured to calculate permutations of the identified words using an n-gram range. Permutations, as used herein, refer to different ways in which a collection of words can be arranged based on the n-gram range. An "n-gram," as used herein, refers to a contiguous sequence of n items from a given sample of text. An "n-gram range," as used herein, refers to the length of the sequence of consecutive words in a given text. For example, an n-gram range of (1, 1) refers to extracting only unigrams (no adjacent words). In another example, an n-gram range of (1, 2) refers to extracting unigrams and bigrams (sequence of two adjacent words). In a further example, an n-gram range of (2, 2) refers to extracting only bigrams.

For example, using the example of FIG. 4, the three closest words to centroid 302 are pension, money and verified. If the n-gram range is (1, 2), which may be provided by the user, then the permutations calculated by arrangement engine 204 using the n-gram range of (1, 2) is the following:
  1: pension, money, verified
  2: pension money, money pension, pension verified, verified pension, money verified, verified money In one embodiment, arrangement engine 204 utilizes various software tools for calculating the permutations of the identified words using an n-gram range, including, but not limited to, N-gram tokenizer, AntGram, kfNgram, etc.

After calculating such permutations, in one embodiment, encoder 201 encodes such permutations using the language model (language model used to obtain the contextualized embeddings of the set of texts 104 discussed above) (e.g., BERT) to obtain a set of contextualized encodings, each of dimension d. In one embodiment, encoder 201 encodes such permutations in the same manner as encoding the set of texts (e.g., set of texts 104) as discussed above.

In one embodiment, similarity engine 203 then identifies the encoded permutation from the encoded permutations with the greatest similarity to centroid 302. In one embodiment, the encoded permutation from the encoded permutations with the greatest similarity to centroid 302 is identified based on cosine similarity. For example, as discussed above, similarity engine 203 calculates the cosine similarity between the permutations' contextualized embeddings with a dimension that corresponds to dimension d, and centroid 302 with a dimension that corresponds to dimension d. Once similarity engine 203 identifies the encoded permutation from the encoded permutations with the greatest similarity (greatest cosine similarity) to centroid 302, arrangement engine 204 assigns the identified encoded permutation as the semantic representation (e.g., semantic representation 105) of the set of texts (e.g., set of texts 104). In this manner, a semantic representation may be obtained outside from a given text.

As a result, the semantic representation (e.g., word, phrase, name, etc.) for a set of texts is more effectively identified by expanding the embedding space upon which the semantic representation is chosen. By utilizing a predefined vocabulary of the language model as well as considering all the text in the set of texts at once, the search space is expanded thereby allowing a semantic representation to be obtained outside from a given text.

A further description of these and other features is provided below in connection with the discussion of the method for identifying a semantic representation for a set of texts.

Prior to the discussion of the method for identifying a semantic representation for a set of texts, a description of the hardware configuration of text analyzer 101 (FIG. 1) is provided below in connection with FIG. 5.

Figure 5:
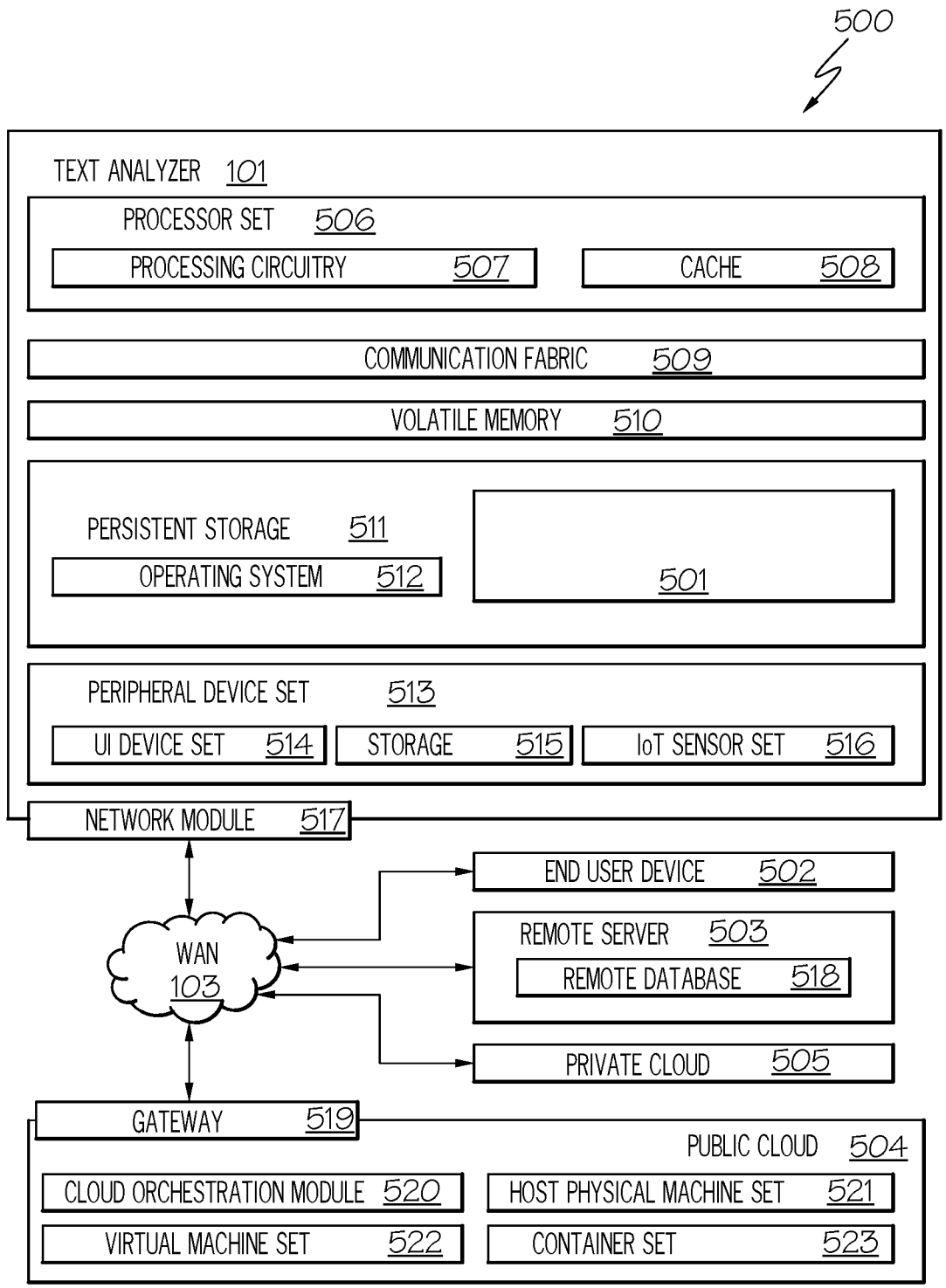
FIG. 5 illustrates an embodiment of the present disclosure of the hardware configuration of the text analyzer which is representative of a hardware environment for practicing the present disclosure.

Referring now to FIG. 5, in conjunction with FIG. 1, FIG. 5 illustrates an embodiment of the present disclosure of the hardware configuration of text analyzer 101 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the inventive methods, such as identifying a semantic representation for a set of texts. In addition to block 501, computing environment 500 includes, for example, text analyzer 101, network 103, such as a wide area network (WAN), end user device (EUD) 502, remote server 503, public cloud 504, and private cloud 505. In this embodiment, text analyzer 101 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Text analyzer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically text analyzer 101, to keep the presentation as simple as possible. Text analyzer 101 may be located in a cloud, even though it is not shown in a cloud in FIG. 5. On the other hand, text analyzer 101 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto text analyzer 101 to cause a series of operational steps to be performed by processor set 506 of text analyzer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of text analyzer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In text analyzer 101, the volatile memory 510 is located in a single package and is internal to text analyzer 101, but, alternatively or additionally, the volatile memory may be distributed over multiple packages and/or located externally with respect to text analyzer 101.

Persistent Storage 511 is any form of non-volatile storage for computers that is now known or to be developed in the future. The non-volatility of this storage means that the stored data is maintained regardless of whether power is being supplied to text analyzer 101 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of text analyzer 101. Data communication connections between the peripheral devices and the other components of text analyzer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where text analyzer 101 is required to have a large amount of storage (for example, where text analyzer 101 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows text analyzer 101 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to text analyzer 101 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates text analyzer 101), and may take any of the forms discussed above in connection with text analyzer 101. EUD 502 typically receives helpful and useful data from the operations of text analyzer 101. For example, in a hypothetical case where text analyzer 101 is designed to provide a recommendation to an end user, this recommendation would typically be communicated from network module 517 of text analyzer 101 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to text analyzer 101. Remote server 503 may be controlled and used by the same entity that operates text analyzer 101. Remote server 503 represents the machine(s) that collect and store helpful and useful data for use by other computers, such as text analyzer 101. For example, in a hypothetical case where text analyzer 101 is designed and programmed to provide a recommendation based on historical data, then this historical data may be provided to text analyzer 101 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to identify a semantic representation for a set of texts. In one embodiment, such components may be implemented in hardware. The functions discussed above performed by such components are not generic computer functions. As a result, text analyzer 101 is a particular machine that is the result of implementing specific, non-generic computer functions.

In one embodiment, the functionality of such software components of text analyzer 101, including the functionality for identifying a semantic representation for a set of texts, may be embodied in an application specific integrated circuit.

As stated above, extraction algorithms (e.g., automatic keyword extraction algorithms) have been utilized to attempt to extract representations from texts that concisely reflect its semantic context. For example, the Text Rank algorithm, based on the PageRank algorithm, creates an undirected word graph where words that appear next to each other in the text are linked and the weight of each link depends on how frequent the two words appear next to each other. Then, based on this graph, each word is ranked which represents the word's importance. Unfortunately, the terms identified by such an extraction algorithm may not concisely reflect the semantic context of the texts. Another example of an extraction algorithm is keyBERT, which leverages BERT (Bidirectional Encoder Representations from Transformers) embeddings to create keywords and key phrases that are most similar to a document. With keyBERT, a BERT-based model is used to obtain embeddings for the entire document as well as for every n-gram phrase in the text. An n-gram is a contiguous sequence of n items from a given sample of text. The BERT-based model then selects the n-gram phrase that satisfies the highest cosine similarity with the overall document embedding as the best representative candidate. Unfortunately, the texts' representative candidates only correspond to the n-grams which appear in the text. Furthermore, the extraction algorithm performs such extraction for each document individually as opposed to a group of documents. Hence, such a technique may not identify the most critical keywords, if such keywords do not appear together or are not located in the text itself. As a result, there is not currently a means for effectively identifying the representation (e.g., word, phrase, name, etc.) that concisely reflects the semantic context of the texts.

The embodiments of the present disclosure provide a means for more effectively identifying a semantic representation (e.g., word, phrase, name, etc.) for a set or collection of texts by expanding the embedding space upon which the semantic representation is chosen as discussed below in connection with FIG. 6.

Figure 6:
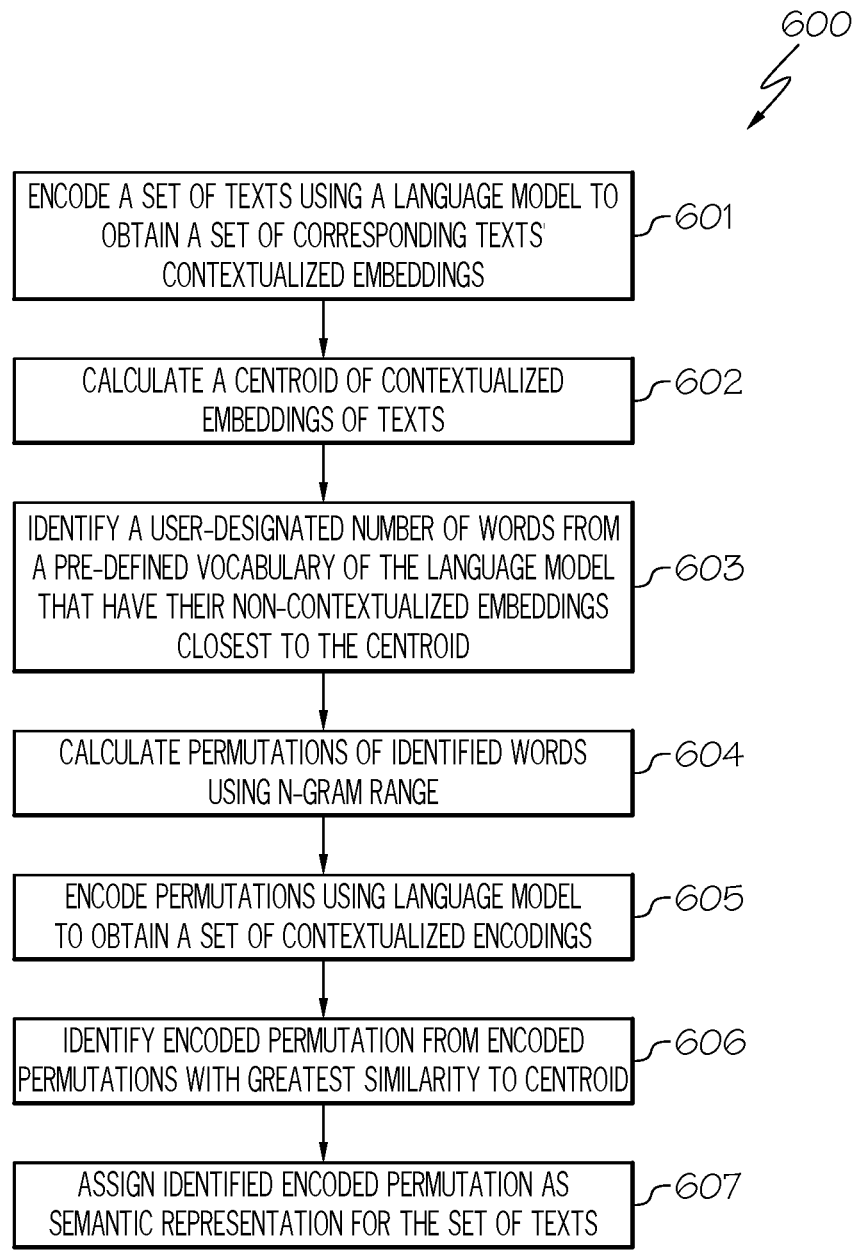
FIG. 6 is a flowchart of a method for identifying a semantic representation for a set of texts in accordance with an embodiment of the present disclosure.

FIG. 6 is a flowchart of a method 600 for identifying a semantic representation for a set of texts in accordance with an embodiment of the present disclosure.

Referring to FIG. 6, in conjunction with FIGS. 1-5, in step 601, encoder 201 of text analyzer 101 encodes a set of texts (e.g., set of texts 104) using a language model to obtain a set of corresponding texts' contextualized embeddings.

As discussed above, "encoding," as used herein, refers to converting text to word embeddings, such as assigning text characters numeric values so as to "vectorize" the text. A "word embedding," as used herein, refers to a dense vector of floating point values (the length of the vector is a parameter specified by a user). That is, word embeddings are dense vector representations of words in lower dimensional space. In other words, word embeddings offer semantic representations of words in vector space. In one embodiment, the values for the word embeddings correspond to trainable parameters which are weights learned by the language model during training.

In one embodiment, word embeddings correspond to contextualized word embeddings (also simply referred to herein as "contextualized embeddings"), which aim at capturing word semantics in different contexts. "Contextualized embeddings," as used herein, refer to vector representations of a word which changes when you use the word in different contexts. In one embodiment, encoder 201 uses a language model, such as a contextualized language model, to convert text to contextualized embeddings. In one embodiment, encoder 201 uses a deep contextual language model, such as ELMo (Embeddings from Language Models) and BERT (Bidirectional Encoder Representation from Transformers), to perform such conversions.

In step 602, analyzing engine 202 of text analyzer 101 calculates a centroid (e.g., centroid 302) of the contextualized embeddings (contextualized embeddings of step 601).

As stated above, a "centroid," as used herein, refers to the center point in space of the embeddings. In one embodiment, the centroid is computed by analyzing engine 202 by uniformly averaging over all dimensions of the contextualized embeddings resulting in the centroid (e.g., centroid 302) with a dimension corresponding to dimension d. Such a centroid (e.g., centroid 302) corresponds to the main semantic meaning of the set of texts 104.

An illustration of calculating a centroid (e.g., centroid 302) for such contextualized embeddings is provided in FIG. 3.

As shown in FIG. 3, set of texts 104 (e.g., S_1, S_2, S_3, S_4, S_5 and S_6) is encoded by encoder 201 using a language model (e.g., BERT) to obtain a set of corresponding texts' contextualized embeddings 301 (e.g., SE_1, SE_2, SE_3, SE_4, SE_5 and SE_6).

As discussed above, in one embodiment, analyzing engine 202 computes the centroid (e.g., centroid 302) of contextualized embeddings 301, such as by uniformly averaging over all dimensions of contextualized embeddings 301 resulting in a centroid 302 with a dimension corresponding to dimension d.

In step 603, similarity engine 203 of text analyzer 101 identifies a user-designated number of words (e.g., three words) from a pre-defined vocabulary of the language model (language model used to obtain the contextualized embeddings of the set of texts 104 discussed above in connection with step 601) (e.g., BERT) that have their non-contextualized embeddings closest to the centroid, such as centroid 302.

As discussed above, a "vocabulary," as used herein, refers to a set of unique words used in a text corpus for the language model (e.g., BERT). In one embodiment, an expert populates the vocabulary of the language model.

In one embodiment, similarity engine 203 identifies the user-designated number of words from the pre-defined vocabulary of the language model (language model used to obtain the contextualized embeddings of the set of texts 104 discussed above in connection with step 601) that have their non-contextualized embeddings closest to centroid 302 by calculating the cosine similarity between the words' non-contextualized embeddings with a dimension that corresponds to dimension d, and centroid 302 with a dimension that corresponds to dimension d as illustrated in FIG. 4. By utilizing words from the pre-defined vocabulary of the language model, the embedding space upon which the semantic representation is chosen is expanded.

In one embodiment, encoder 201 encodes the words from the pre-defined vocabulary of the language model (language model used to obtain the contextualized embeddings of the set of texts 104 discussed above in connection with step 601) using a language model (discussed below) to obtain a set of corresponding non-contextualized embeddings. "Non-contextualized embeddings," as used herein, refer to embeddings where the vector representation is static. That is, the embedding is the same no matter how the word is used in the sentence. In other words, the vector representation of the word does not change when you use the word in different contexts.

In one embodiment, encoder 201 utilizes a Word2Vec approach to obtain non-contextualized embeddings from the pre-defined vocabulary of the language model (language model used to obtain the contextualized embeddings of the set of texts 104 discussed above in connection with step 601). Word2Vec is a group of related models that are used to produce word embeddings. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space.

In one embodiment, the language model used by encoder 201 to obtain the non-contextualized embeddings from the pre-defined vocabulary corresponds to the continuous bag-of-words (CBOW) model using the Word2Vec approach. In one embodiment, the language model corresponds to the continuous skip-gram model using the Word2Vec approach.

In another embodiment, encoder 201 uses the GloVe (global vectors) model for obtaining the set of non-contextualized embeddings from the pre-defined vocabulary of the language model (language model used to obtain the contextualized embeddings of the set of texts 104 discussed above). In one embodiment, GloVe model is an unsupervised learning algorithm for obtaining vector representations for words. In one embodiment, such vector representations for words are achieved by mapping words into a meaningful space where the distance between the words is related to semantic similarity.

In one embodiment, similarity engine 203 calculates the cosine similarity between the words' non-contextualized embeddings with a dimension that corresponds to dimension d, and centroid 302 with a dimension that corresponds to dimension d. "Cosine similarity," as used herein, refers to a measure of similarity between two non-zero vectors defined in an inner product space. Cosine similarity is the cosine of the angle between the vectors. That is, it is the dot product of the vectors divided by the product of their lengths.

Referring to FIG. 4, FIG. 4 illustrates identifying a user-designated number of words (e.g., three) from the pre-defined vocabulary of the language model (language model used to obtain the contextualized embeddings of the set of texts 104 discussed above) that have their non-contextualized embeddings closest to centroid 302.

As shown in FIG. 4, encoder 201 encodes the words from the pre-defined vocabulary of the language model (language model used to obtain the contextualized embeddings of the set of texts 104 discussed above) using a language model (e.g., GloVe model) to obtain a set of corresponding non-contextualized embeddings 401 (e.g., WE_1, WE_2, WE_3, WE_4, WE_5, WE_6, WE_15, WE_19, WE_28, WE_460, WE_468, WE_1241).

Furthermore, as shown in FIG. 4, similarity engine 203 fetches K closest words 402 (words' non-contextualized embeddings) out of the pre-defined vocabulary to centroid 302, where K=3 (see element 403).

As discussed above, in one embodiment, as shown in FIG. 4, similarity engine 203 identifies the three words from the pre-defined vocabulary of the language model (language model used to obtain the contextualized embeddings of the set of texts 104 discussed above) that have their non-contextualized embeddings as being the three closest to centroid 302 by calculating the cosine similarity between the words' non-contextualized embeddings with a dimension that corresponds to dimension d, and centroid 302 with a dimension that corresponds to dimension d. For example, the words, pension, money and verified, associated with the non-contextualized embeddings W_15, W_460 and W_28, respectively, were identified as being the three closest words (the words' non-contextualized embeddings) to centroid 302 as shown by element 404.

In step 604, arrangement engine 204 of text analyzer 101 calculates permutations of the identified words using an n-gram range.

As stated above, permutations, as used herein, refer to different ways in which a collection of words can be arranged based on the n-gram range. An "n-gram," as used herein, refers to a contiguous sequence of n items from a given sample of text. An "n-gram range," as used herein, refers to the length of the sequence of consecutive words in a given text. For example, an n-gram range of (1, 1) refers to extracting only unigrams (no adjacent words). In another example, an n-gram range of (1, 2) refers to extracting unigrams and bigrams (sequence of two adjacent words).

In a further example, an n-gram range of (2, 2) refers to extracting only bigrams.

For example, using the example of FIG. 4, the three closest words to centroid 302 are pension, money and verified. If the n-gram range is (1, 2), which may be provided by the user, then the permutations calculated by arrangement engine 204 using the n-gram range of (1, 2) is the following:
1: pension, money, verified
2: pension money, money pension, pension verified, verified pension, money verified, verified money In one embodiment, arrangement engine 204 utilizes various software tools for calculating the permutations of the identified words using an n-gram range, including, but not limited to, N-gram tokenizer, AntGram, kfNgram, etc.

In step 605, encoder 201 of text analyzer 101 encodes the permutations (calculated in step 604) using the language model (e.g., BERT) to obtain a set of contextualized encodings, each of dimension d. In one embodiment, encoder 201 encodes such permutations in the same manner as encoding the set of texts (e.g., set of texts 104) as discussed above in connection with step 601.

In step 606, similarity engine 203 of text analyzer 101 identifies the encoded permutation from the encoded permutations with the greatest similarity to centroid 302.

As discussed above, in one embodiment, the encoded permutation from the encoded permutations with the greatest similarity to centroid 302 is identified based on cosine similarity. For example, as discussed above, similarity engine 203 calculates the cosine similarity between the permutations' contextualized embeddings with a dimension that corresponds to dimension d, and centroid 302 with a dimension that corresponds to dimension d. As a result, the encoded permutation from the encoded permutations with the greatest similarity to centroid 302 is identified based on having the greatest cosine similarity to centroid 302.

In step 607, arrangement engine 204 of text analyzer 101 assigns the identified encoded permutation as the semantic representation (e.g., semantic representation 105) of the set of texts (e.g., set of texts 104). In this manner, a semantic representation may be obtained outside from a given text.

Furthermore, in this manner, the principles of the present disclosure more effectively identify the semantic representation (e.g., word, phrase, name, etc.) for a set of texts by expanding the embedding space upon which the semantic representation is chosen. By utilizing a pre-defined vocabulary of the language model as well as considering all the text in the set of texts at once, the search space is expanded thereby allowing a semantic representation to be obtained outside from a given text.

Furthermore, the principles of the present disclosure improve the technology or technical field involving information extraction. As discussed above, extraction algorithms (e.g., automatic keyword extraction algorithms) have been utilized to attempt to extract representations from texts that concisely reflect its semantic context. For example, the Text Rank algorithm, based on the PageRank algorithm, creates an undirected word graph where words that appear next to each other in the text are linked and the weight of each link depends on how frequent the two words appear next to each other. Then, based on this graph, each word is ranked which represents the word's importance. Unfortunately, the terms identified by such an extraction algorithm may not concisely reflect the semantic context of the texts. Another example of an extraction algorithm is keyBERT, which leverages BERT (Bidirectional Encoder Representations from Transformers) embeddings to create keywords and key phrases that are most similar to a document. With keyBERT, a BERT-based model is used to obtain embeddings for the entire document as well as for every n-gram phrase in the text. An n-gram is a contiguous sequence of n items from a given sample of text. The BERT-based model then selects the n-gram phrase that satisfies the highest cosine similarity with the overall document embedding as the best representative candidate. Unfortunately, the texts' representative candidates only correspond to the n-grams which appear in the text. Furthermore, the extraction algorithm performs such extraction for each document individually as opposed to a group of documents. Hence, such a technique may not identify the most critical keywords, if such keywords do not appear together or are not located in the text itself. As a result, there is not currently a means for effectively identifying the representation (e.g., word, phrase, name, etc.) that concisely reflects the semantic context of the texts.

Embodiments of the present disclosure improve such technology by encoding a set of texts using a language model to obtain a set of corresponding texts' contextualized embeddings. "Encoding," as used herein, refers to converting text to word embeddings, such as assigning text characters numeric values so as to "vectorize" the text. A "word embedding," as used herein, refers to a dense vector of floating point values (the length of the vector is a parameter specified by a user). That is, word embeddings are dense vector representations of words in lower dimensional space. In other words, word embeddings offer semantic representations of words in vector space. In one embodiment, word embeddings correspond to contextualized word embeddings (also simply referred to herein as "contextualized embeddings"), which aim at capturing word semantics in different contexts. "Contextualized embeddings," as used herein, refer to vector representations of a word which changes when you use the word in different contexts. A centroid of the contextualized embeddings is then calculated. A "centroid," as used herein, refers to the center point in space of the embeddings. In one embodiment, the centroid is computed by uniformly averaging over all dimensions of the contextualized embeddings resulting in the centroid with a dimension corresponding to dimension d. A user-designated number of words (e.g., three words) from a pre-defined vocabulary of the language model (e.g., BERT) that have their non-contextualized embeddings closest to the centroid are identified. In one embodiment, the words from the pre-defined vocabulary of the language model that have their non-contextualized embeddings closest to the centroid are identified by calculating the cosine similarity between the words' non-contextualized embeddings with a dimension that corresponds to dimension d, and the centroid with a dimension that corresponds to dimension d. Furthermore, permutations of the identified words are calculated using an n-gram range. "Permutations," as used herein, refer to different ways in which a collection of words can be arranged based on the n-gram range. An "n-gram," as used herein, refers to a contiguous sequence of n items from a given sample of text. An "n-gram range," as used herein, refers to the length of the sequence of consecutive words in a given text. The permutations may then be encoded using the language model in a contextualized manner. The encoded permutation from the encoded permutations with the greatest similarity to the centroid is identified. The identified encoded permutation is then assigned as the semantic representation of the set of texts. In this manner, the semantic representation (e.g., word, phrase, name, etc.) for the set of texts is more effectively identified by expanding the embedding space upon which the semantic representation is chosen. Furthermore, in this manner, there is an improvement in the technical field involving information extraction.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for identifying a semantic representation for a set of texts comprises encoding the set of texts using a language model to obtain a set of contextualized embeddings. The method further comprises calculating a centroid of the contextualized embeddings. The method additionally comprises identifying a user-designated number of words from a pre-defined vocabulary of the language model that have their non-contextualized embeddings closest to the centroid. Furthermore, the method comprises calculating permutations of the identified words using an n-gram range. Additionally, the method comprises encoding the permutations using the language model in a contextualized manner. In addition, the method comprises identifying an encoded permutation from the encoded permutations with a greatest similarity to the centroid. The method further comprises assigning the identified encoded permutation as the semantic representation for the set of texts.

Furthermore, in one embodiment of the present disclosure, the method additionally comprises having the centroid be calculated by uniformly averaging over all dimensions of the contextualized embeddings of the set of texts resulting in the centroid with a dimension corresponding to a first dimension.

Additionally, in one embodiment of the present disclosure, the method further comprises identifying the user-designated number of words from the pre-defined vocabulary of the language model that have their non-contextualized embeddings closest to the centroid by calculating a cosine similarity between non-contextualized embeddings of the words from the pre-defined vocabulary of the language model with a dimension corresponding to the first dimension to the centroid with a dimension corresponding to the first dimension.

Furthermore, in one embodiment of the present disclosure, the method additionally comprises having the encoded permutation from the encoded permutations with the greatest similarity to the centroid be identified based on cosine similarity.

Additionally, in one embodiment of the present disclosure, the method further comprises having the contextualized embeddings of the set of texts have a dimension corresponding to a first dimension, and having the centroid have a dimension corresponding to the first dimension.

Furthermore, in one embodiment of the present disclosure, the method additionally comprises encoding the permutations using the language model to obtain a second set of contextualized encodings.

Additionally, in one embodiment of the present disclosure, the method further comprises having the centroid have a dimension corresponding to a first dimension, and having the second set of contextualized encodings have a dimension corresponding to the first dimension.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying a semantic representation for a set of texts, the method comprising:
    encoding said set of texts using a language model to obtain a set of contextualized embeddings;
    calculating a centroid of said contextualized embeddings;
    identifying a user-designated number of words from a pre-defined vocabulary of said language model that have their non-contextualized embeddings closest to said centroid;
    calculating permutations of said identified words using an n-gram range;
    encoding said permutations using said language model in a contextualized manner;
    identifying an encoded permutation from said encoded permutations with a greatest similarity to said centroid; and
    assigning said identified encoded permutation as said semantic representation for said set of texts.

2. The method as recited in claim 1, wherein said centroid is calculated by uniformly averaging over all dimensions of said contextualized embeddings of said set of texts resulting in said centroid with a dimension corresponding to a first dimension.

3. The method as recited in claim 2 further comprising:
    identifying said user-designated number of words from said pre-defined vocabulary of said language model that have their non-contextualized embeddings closest to said centroid by calculating a cosine similarity between non-contextualized embeddings of said words from said pre-defined vocabulary of said language model with a dimension corresponding to said first dimension to said centroid with a dimension corresponding to said first dimension.

4. The method as recited in claim 1, wherein said encoded permutation from said encoded permutations with said greatest similarity to said centroid is identified based on cosine similarity.

5. The method as recited in claim 1, wherein said contextualized embeddings of said set of texts have a dimension corresponding to a first dimension, wherein said centroid has a dimension corresponding to said first dimension.

6. The method as recited in claim 1 further comprising:
    encoding said permutations using said language model to obtain a second set of contextualized encodings.

7. The method as recited in claim 6, wherein said centroid has a dimension corresponding to a first dimension, wherein said second set of contextualized encodings have a dimension corresponding to said first dimension.

8. A computer program product for identifying a semantic representation for a set of texts, the computer program product comprising one or more computer readable storage mediums having program code embodied therewith, the program code comprising programming instructions for:
    encoding said set of texts using a language model to obtain a set of contextualized embeddings;
    calculating a centroid of said contextualized embeddings;
    identifying a user-designated number of words from a pre-defined vocabulary of said language model that have their non-contextualized embeddings closest to said centroid;
    calculating permutations of said identified words using an n-gram range;
    encoding said permutations using said language model in a contextualized manner;
    identifying an encoded permutation from said encoded permutations with a greatest similarity to said centroid; and
    assigning said identified encoded permutation as said semantic representation for said set of texts.

9. The computer program product as recited in claim 8, wherein said centroid is calculated by uniformly averaging over all dimensions of said contextualized embeddings of said set of texts resulting in said centroid with a dimension corresponding to a first dimension.

10. The computer program product as recited in claim 9, wherein the program code further comprises the programming instructions for:
    identifying said user-designated number of words from said pre-defined vocabulary of said language model that have their non-contextualized embeddings closest to said centroid by calculating a cosine similarity between non-contextualized embeddings of said words from said pre-defined vocabulary of said language model with a dimension corresponding to said first dimension to said centroid with a dimension corresponding to said first dimension.

11. The computer program product as recited in claim 8, wherein said encoded permutation from said encoded permutations with said greatest similarity to said centroid is identified based on cosine similarity.

12. The computer program product as recited in claim 8, wherein said contextualized embeddings of said set of texts have a dimension corresponding to a first dimension, wherein said centroid has a dimension corresponding to said first dimension.

13. The computer program product as recited in claim 8, wherein the program code further comprises the programming instructions for:
    encoding said permutations using said language model to obtain a second set of contextualized encodings.

14. The computer program product as recited in claim 13, wherein said centroid has a dimension corresponding to a first dimension, wherein said second set of contextualized encodings have a dimension corresponding to said first dimension.

15. A system, comprising:
    a memory for storing a computer program for identifying a semantic representation for a set of texts; and a processor connected to said memory, wherein said processor is configured to execute program instructions of the computer program comprising:

encoding said set of texts using a language model to obtain a set of contextualized embeddings;

calculating a centroid of said contextualized embeddings;

identifying a user-designated number of words from a pre-defined vocabulary of said language model that have their non-contextualized embeddings closest to said centroid;

calculating permutations of said identified words using an n-gram range;

encoding said permutations using said language model in a contextualized manner;

identifying an encoded permutation from said encoded permutations with a greatest similarity to said centroid; and assigning said identified encoded permutation as said semantic representation for said set of texts.

16. The system as recited in claim 15, wherein said centroid is calculated by uniformly averaging over all dimensions of said contextualized embeddings of said set of texts resulting in said centroid with a dimension corresponding to a first dimension.

17. The system as recited in claim 16, wherein the program instructions of the computer program further comprise:

identifying said user-designated number of words from said pre-defined vocabulary of said language model that have their non-contextualized embeddings closest to said centroid by calculating a cosine similarity between non-contextualized embeddings of said words from said pre-defined vocabulary of said language model with a dimension corresponding to said first dimension to said centroid with a dimension corresponding to said first dimension.

18. The system as recited in claim 15, wherein said encoded permutation from said encoded permutations with said greatest similarity to said centroid is identified based on cosine similarity.

19. The system as recited in claim 15, wherein said contextualized embeddings of said set of texts have a dimension corresponding to a first dimension, wherein said centroid has a dimension corresponding to said first dimension.

20. The system as recited in claim 15, wherein the program instructions of the computer program further comprise:

encoding said permutations using said language model to obtain a second set of contextualized encodings.

* * * * *